United States Patent [19]

Olson et al.

[11] Patent Number: 4,469,952

[45] Date of Patent: Sep. 4, 1984

[54] ADAPTER FOR DIESEL-ENGINE-TIMING METER

[75] Inventors: Gene E. Olson; Thomas P. Becker; Donald D. Grover, all of Kenosha, Wis.

[73] Assignee: Snap-on Tools Corporation, Kenosha, Wis.

[21] Appl. No.: 383,009

[22] Filed: May 28, 1982

[51] Int. Cl.³ .............................................. G02B 27/00
[52] U.S. Cl. ..................................... 250/551; 324/392
[58] Field of Search .................. 250/551, 231 R, 227; 73/3 S, 117.2, 117.3; 324/378, 391, 392

[56] References Cited
U.S. PATENT DOCUMENTS 4,063,152 12/1977 Reeves ................................ 324/392
4,446,841 5/1984 Vansiclen ........................... 250/551

Primary Examiner—David C. Nelms
Attorney, Agent, or Firm—Emrich & Dithmar

[57] ABSTRACT

The adapter includes a housing containing a rectifier for supplying flash voltages to an LED. The rectifier rectifies inductive signals derived from an inductive pickup. The adapter can be used to enable a spark-ignited engine calibrator to calibrate a diesel-engine-timing meter by converting the inductive electrical signals from the calibrator to light signals for the diesel timing meter. The adapter also can be used to enable a diesel-engine-timing meter and analyze and time a spark-ignited engine by converting the inductive pulses derived from a spark plug wire into light impulses for the diesel-engine-timing meter.

18 Claims, 6 Drawing Figures

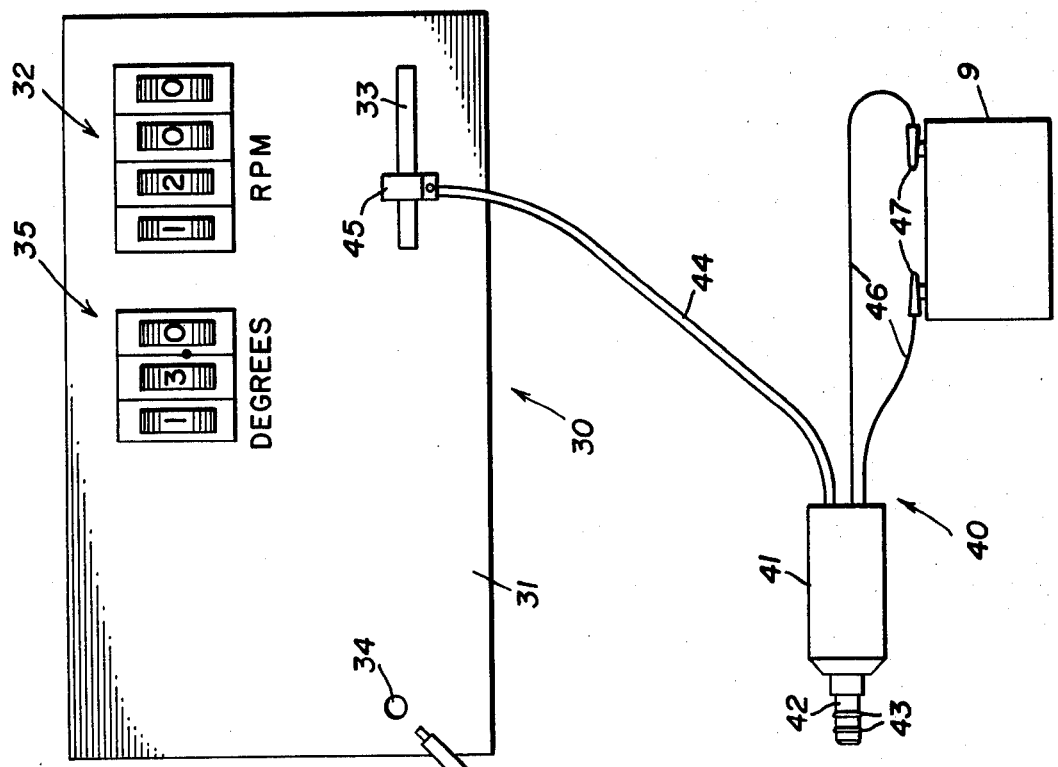
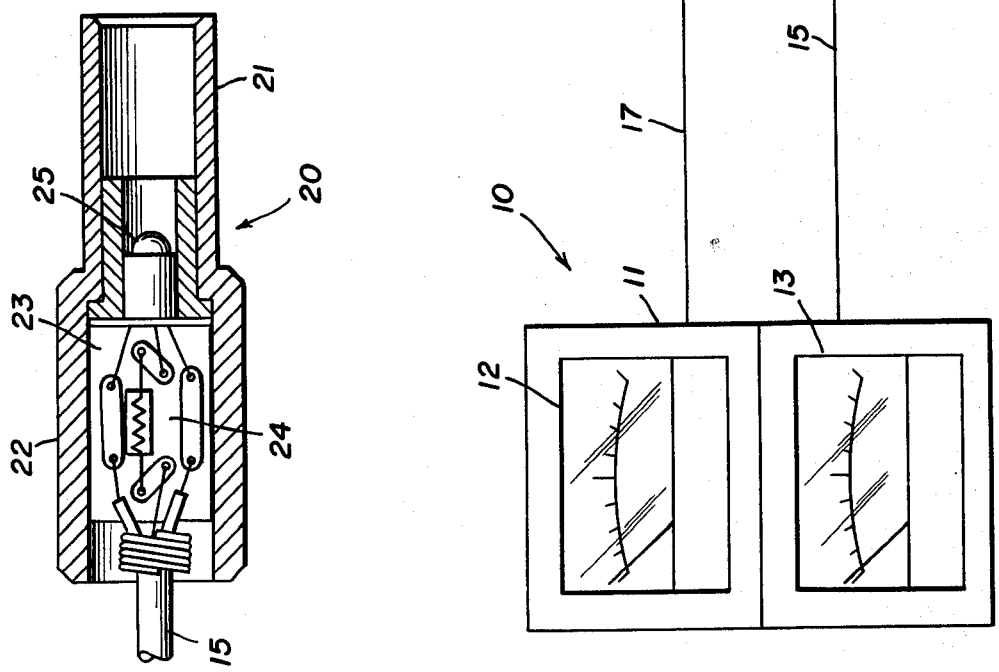

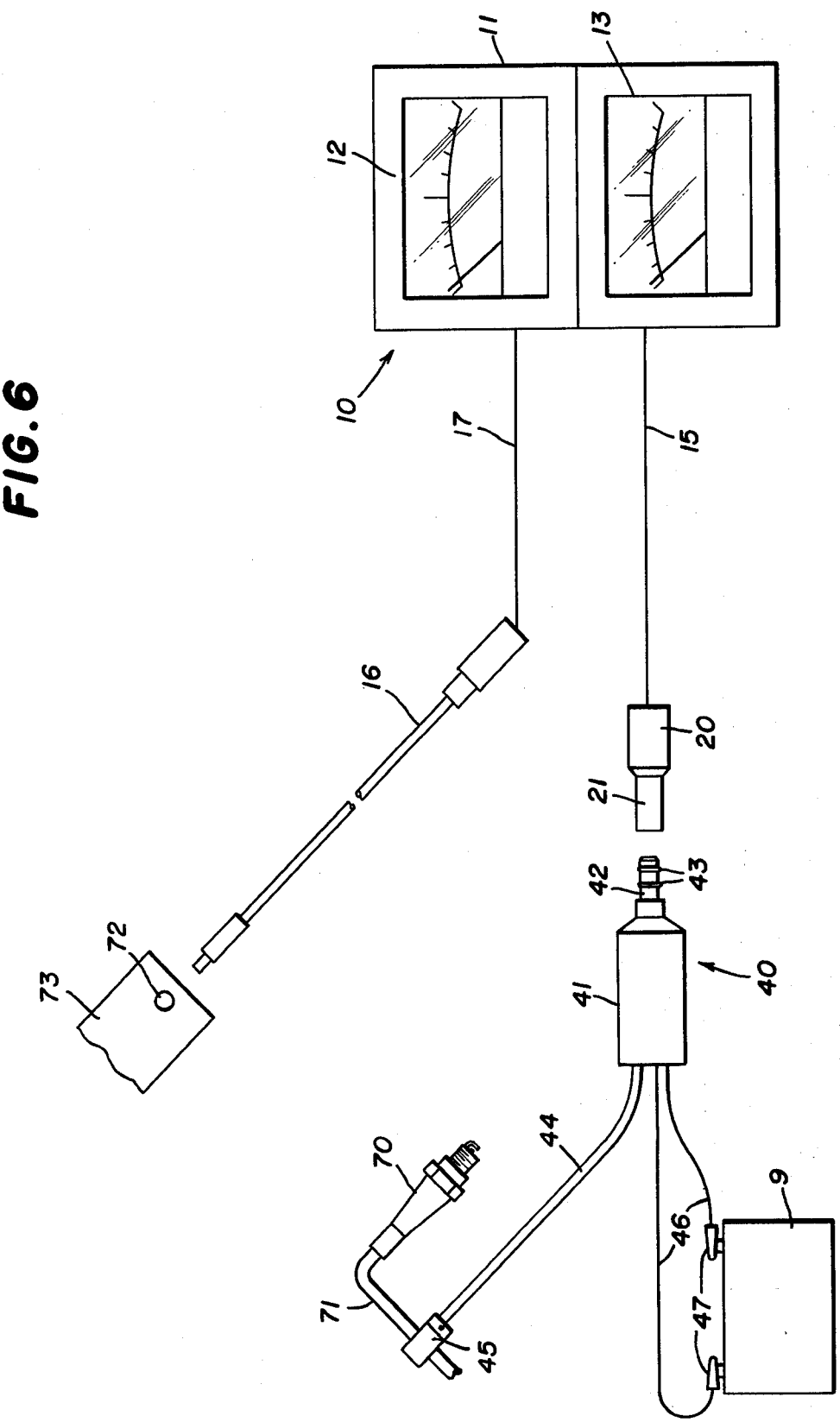

ADAPTER FOR DIESEL-ENGINE-TIMING METER

BACKGROUND OF THE INVENTION

Pending patent applications assigned to the assignee of this application and bearing Ser. No. 285,942 now U.S. Pat. No. 4,441,021 and Ser. No. 286,186 now U.S. Pat. No. 4,373,384 disclose a diesel-engine-timing meter for use in analyzing the timing of a diesel engine. Such analysis includes determining so-called timing angle; that is, the number of degrees between the time a piston in a selected cylinder reaches its top-dead-center position and the time that combustion takes place in that cylinder. Automobile manufacturers commonly specify the number of degrees at a specific engine speed as a compromise to numerous considerations which must be taken into account. Thus, a diesel-engine-timing meter determines the number of degrees between top dead center and combustion.

Top dead center is identified in the following manner. A diesel engine includes a wheel mounted on the end of the engine crankshaft so as to rotate therewith. A notch or other marking means is located in the periphery of the wheel. A receptacle for a magnetic probe is positioned on the engine block and is so located that the notch on the rotating wheel will pass the receptacle a known number of degrees of crankshaft rotation after the number one, or other selected cylinder has reached its top-dead-center position.

As described in the aforementioned applications, the combustion event is sensed by light occurring during combustion. The glow plug for the prechamber associated with the number one, or other selected, cylinder is removed and a luminosity probe is inserted in its place. The luminosity probe includes a sensor which responds to light produced during combustion and generates an electrical signal.

It is important that the reading on the timing meter be accurate. For example, if the meter reads "20°", then there must in fact be a delay of 20°. After determining precisely the magnitude of timing angle, the meter can be adjusted so that the displayed value is accurate.

One calibrator currently in the marketplace includes a loop at which a series of first pulses is generated, and a jack at which a series of second pulses is generated. The calibrator has means to establish the angle or delay between corresponding first and second pulses. The calibrator also has another selector for establishing the frequency of the pulses. In addition, such calibrator has other features not pertinent to the present discussion such as a knob to select the number of cylinders in the engine, a digital meter that displays timing angle when calibrating a timing light, etc.

Such calibrator is used to calibrate a spark-ignited-engine-timing meter by applying the first pulses to a clip which is normally applied to the conductor associated with a selected spark plug. The series of second pulses is applied to a magnetic probe which in use is mounted on the engine block to sense a notch or the like in the flywheel.

SUMMARY OF THE INVENTION

It is therefore an important object of the present invention to provide an adapter enabling use of a spark-ignited-engine-timing meter calibrator to calibrate a diesel-engine-timing meter.

Another object is to provide an adapter which would enable a diesel-engine-timing meter to analyze and time a spark-ignited engine.

In summary, there is provided an adapter enabling use of a spark-ignited engine calibrator to calibrate a diesel-engine-timing meter, the diesel timing meter including an optical detector for producing an electrical signal in response to light developed during combustion in a diesel engine, the optical detector being carried by a detector housing, a magnetic probe for producing a signal representative of a top dead center event, a display for engine speed, and a display for the amount of timing angle, the calibrator including means for generating at a terminal a series of first pulses, means for generating at a jack a series of second pulses, the jack being constructed to receive the magnetic probe, a first selector for establishing the angle between corresponding first and second pulses, and a second selector for establishing the frequency of the pulses, the adapter comprising inductive means adapted to be clipped onto the terminal for supplying a series of inductive signals in response to the series of first pulses, rectifier means coupled to said inductive means for supplying a flash voltage substantially at the inception of each inductive signal, a light source coupled to the rectifier means and being responsive to the flash voltage therefrom to flash, and an adaptor housing constructed to mate with the detector housing, the light source being mounted in the adapter housing and arranged to direct the flashes toward the optical detector.

In a further aspect of the invention the diesel-engine-timing meter is used to analyze the timing angle of a spark-ignited engine, the spark-ignited engine having at least one spark plug, a distributor conductor connected thereto in which a pulse of electrical current is generated as the spark plug fires, a rotating part having a surface irregularity therein, and means defining a receptacle and located so that the surface irregularity passes thereby, the inductive means of the adapter being adapted to be clipped onto the distributor conductor of the engine, and the magnetic probe being insertable in the engine receptacle.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 depicts a diesel-engine-timing meter, a spark-ignited-engine-timing meter calibrator, and an adapter to enable use of the calibrator to calibrate the diesel-engine-timing meter;

FIG. 2 is a cross-sectional view on an enlarged scale of the optical detector of the timing meter;

FIG. 6 depicts another embodiment of the present invention wherein the adapter couples a spark-ignited engine to a diesel-engine-timing meter.

DETAILED DESCRIPTION OF THE PREFERRED EMBODIMENT

Figure 3:
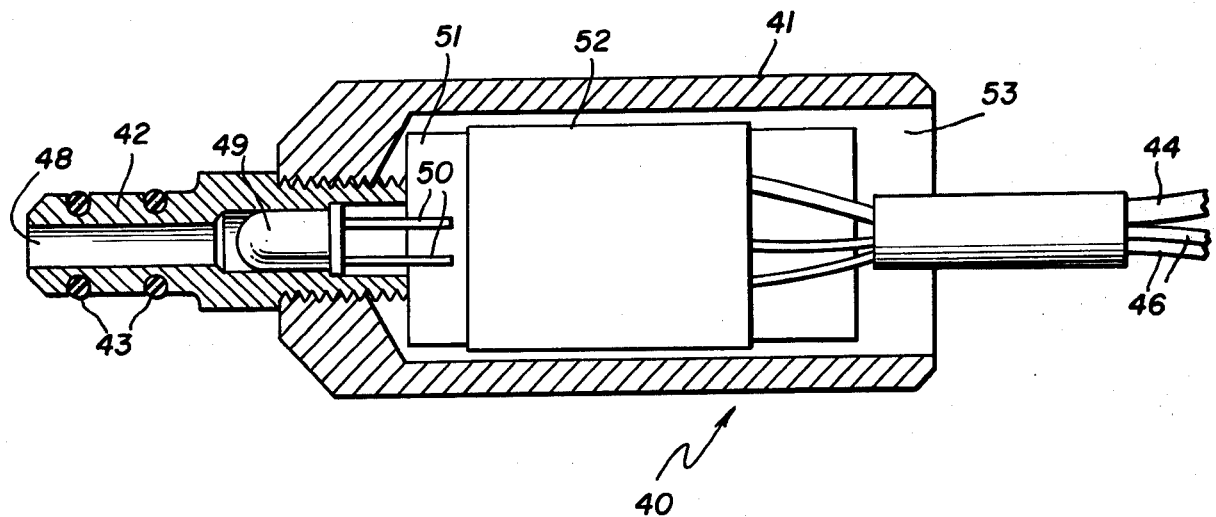
FIG. 3 is a cross-sectional view on an enlarged scale of the adapter.

Turning now to the drawings and more particularly to FIG. 1 thereof, there is depicted a diesel engine timing meter 10 used to analyze and to time a diesel engine (not shown). Each cylinder in the engine has an associated prechamber which in turn has a threaded opening to accommodate a glow plug. The glow plug for a selected cylinder is removed for the purpose of using the timing meter 10 and replaced by a luminosity probe (not shown). The meter 10 includes a housing 11 which carries a display 12 for displaying speed of the engine in rpm. A second display 13 in the housing 11 displays the amount of timing angle in degrees of the diesel engine being timed. The meter 10 includes an optical detector 20 which is affixed to the luminosity probe (not shown) mentioned above. The luminosity probe transmits the light occurring during the combustion event to the detector 20. The detector 20 has a transducer which converts the light into an electrical signal on the conductor 15.

The crankshaft for the engine has a rotating wheel attached thereto. The manufacturer provides a notch in the wheel which passes a receptacle a predetermined number of degrees after the piston in the selected cylinder reaches top dead center. The meter 10 includes a magnetic probe 16 connected by means of a conductor 17. When the engine is being analyzed, the magnetic probe 16 magnetically responds to the notch in the rotating wheel to provide an electrical signal on the conductor 17. The receptacle is so located that the notch passes it a certain number of degrees after top dead center.

To calibrate the timing meter 10, there is provided a calibrator 30 which has a front panel 31. On the panel 31 is a speed control 32 consisting of a set of four thumbwheels (the first three may be adjustable and the fourth fixed). The thumbwheels can be set so the engine speed is at a value between 10 and 9990 rpm, at 10 rpm increments, for example.

Also mounted on the front panel 31 is an inductive pickup loop 33 at which a series of first pulses is generated at the frequency set by the speed control 32. In the panel 31 is a jack 34 in which a second series of pulses at the same speed is generated. The angle or number of degrees between corresponding pulses in the two series is established by an timing control 35. It consists of a plurality of (say three) thumbwheels to set the selected number of degrees.

The calibrator 30 is used to calibrate a spark-ignited-engine-timing meter, the first series of pulses corresponding to the pulses obtained from the distributor conductor to a selected spark plug and the second series corresponding to the pulses obtained from the magnetic probe disposed adjacent to the rotating flywheel.

In order to utilize the calibrator 30 to calibrate the diesel-engine-timing meter 10, there is provided an adapter 40. The adapter 40 includes a tubular housing 41 which carries a protruding tubular element 42. The outer diameter of the element 42 is less than the inner diameter of the tubular element 21 so as to telescopically fit therein. A pair of O-rings 43 defines a resilient seal to establish a detachable, frictional, light-tight connection between the elements 21 and 42. The adapter 40 also comprises a cable 44 which carries a clip 45 adapted to encircle the pickup loop 33. A pair of conductors 46 are connected to the vehicle battery 9 by means of clips 47. In use, the element 42 is inserted into the element 21. The inductive signals on the pickup loop 33 are coupled by way of the clip 45 and the cable 44 to circuitry in the housing 41 where the series of flashes is generated. Those flashes are coupled to the detector 20 and into the timing meter 10.

The calibration is performed at a selected speed by setting the speed control 32 to such speed. The timing control 35 is set to a predetermined timing angle setting such as 13°. If the display 13 does not depict the number "13°", a potentiometer or the like in the timing meter 10 is adjusted until it does. The same steps can be performed with respect to another speed setting, depending on the specifications of the timing meter 10.

Details of the optical detector 20 are depicted in FIG. 2. The optical detector 20 includes a tubular housing 22, which carries a reduced diameter tubular element 21. Within the main housing 22 is a printed circuit board 23 with electrical components such as resistors, etc. A photodetector 25 is mounted in the housing 22 and protrudes partly into the tubular element 21. The photodetector 25 includes means for converting optical energy applied thereto to electrical signals on the conductor 15.

Further details of the adapter 40 are depicted in FIG. 3. As can be seen, the tubular element 42 has a bore extending axially therethrough and is threadably attached to the housing 41. Mounted in an enlarged portion of the bore 48 is an LED 49 or other light source.

Figure 4:
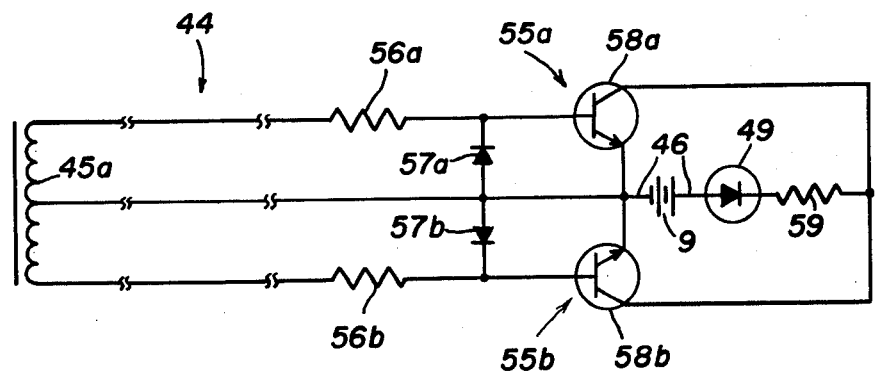
FIG. 4 is a schematic diagram of the electronic circuitry in the adapter.

The leads of the LED 49 are mechanically and electrically connected to a printed circuit board 51 which carries a number of electrical components schematically depicted in FIG. 4. The printed circuit board is located in a cavity 53 of the housing 41. The components are protected and encased by a heat-shrunk wrapping 52.

Referring now to FIG. 4, details of the electrical circuit of the adapter 40 will be described. Within the clip 45 is a center-tapped inductor 45a. The ends of the inductor 45a and its center tap are connected by means of the cable 44 to the components on the printed circuit board 51. The ends of the inductor 45a are connected to rectifier circuits 55a and 55b. The rectifier circuit 55a includes a resistor 56a connected in series with a diode 57a between the "top" of the inductor 45a and its center tap. The rectifier circuit 55a also includes an NPN transistor 58a having its base connected to the junction between the resistor 56a and the diode 57a. The center tap of the inductor 45a is connected to ground as is the emitter of the transistor 58a. The collector of the transistor 58a is connected by way of a resistor 59 to the LED 49. The battery 9 is connected between ground and the LED 49 by way of the conductors 46. The other rectifier circuit 55b has corresponding components.

Figure 5:
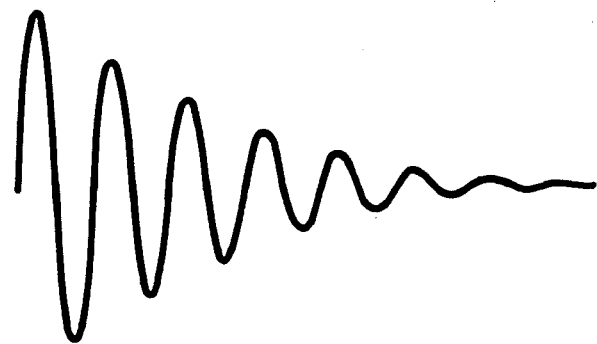
FIG. 5 is a wave form of the signal applied to the adapter from the calibrator.

The purpose for the dual rectification circuit may be best understood by reference to FIG. 5 which depicts the wave form of the signal generated on the pickup loop 33. It is the result of a pulse applied to a ringing circuit; thus the decay. It is important that the LED 49 flash at the commencement of the ringing signal. If the clip 45a is connected such that the ringing signal happens to be directed first in the positive direction, as shown, then its appearing on the "top" of the inductor 45a will enable it to be rectified by the rectifier circuit 55a to cause the LED 49 to flash. On the other hand, if the clip 45 is connected in the opposite direction, the wave form of the signal on "top" of the inductor 45a will be 180° out of phase. But, a positive counterpart will appear at the "bottom" of the inductor 45a which will be rectified by the rectifier circuit 55b. In that case, such rectified voltage causes the LED 49 to flash. Thus, irrespective of the polarity of the ringing voltage produced on the pickup loop 33, the LED 49 will flash at the inception of the wave form.

Effectively, the adapter 40 converts the inductive pulses on the pickup loop 33 into light pulses in order to be utilized by the optical detector 20 of the diesel-engine-timing meter 10. Thus, the spark-ignited-engine-timing meter calibrator 30 can be used to calibrate a diesel-engine-timing meter 10.

Another use of the adapter 40 is depicted in FIG. 6. The adapter 40 is to enable use of the diesel-engine-timing meter 10 to time and analyze a spark-ignited engine having a number of spark plugs, one such spark plug 70 being shown. It is connected to the distributor by means of a distributor conductor 71.

As explained previously, the crankshaft for the engine has a rotating wheel attached thereto. The manufacturer provides a notch or other surface irregularity in the wheel which passes a receptacle 72 and a plate 73 attached to the engine block. The receptacle 72 is located a predetermined number of degrees after the piston in the selected cylinder associated with the spark plug 70 reaches top dead center. When the spark-ignited engine is being analyzed, there is inserted into such a receptacle 72 the probe 16 which magnetically responds to the notch in the rotating flywheel to provide an electrical signal on the conductor 17. The current in the distributor conductor 71 causes an electrical signal to be generated in the conductor 45a (FIG. 4) of the clip 45 which is transmitted by the cable 44 to the rectifier circuits 55a and 55b in the adapter 40, thereby to cause the LED 49 to flash. Those flashes are applied to the optical detector 20 which converts them into electrical signals on the conductor 15. The electrical signals on the conductors 15 and 17 are analyzed by the timing meter 10 to provide an indication of the engine speed on the display 12 and the amount of timing angle (the number of degrees between corresponding pulses) on the display 13.

What has been described, therefore, is an adapter for enabling a spark-ignited-engine-timing meter calibrator to calibrate a diesel timing meter. The same adapter can be used to enable a diesel engine timing meter to be used to analyze and time a diesel engine, or spark ignited engine.

We claim:

1. An adapter enabling use of a spark-ignited engine calibrator to calibrate a diesel-engine-timing meter, the diesel timing meter including an optical detector for producing an electrical signal in response to light developed during combustion in a diesel engine, the optical detector being carried by a detector housing, a magnetic probe for producing a signal indicative of a top dead center event, a display for engine speed, and a display for the amount of timing angle, the calibrator including means for generating at a terminal a series of first pulses, means for generating at a jack a series of second pulses, the jack being constructed to receive the magnetic probe, a first selector for establishing the angle between corresponding first and second pulses, and a second selector for establishing the frequency of the pulses, said adapter comprising inductive means adapted to be clipped onto the terminal for supplying a series of inductive signals in response to the series of first pulses, rectifier means coupled to said inductive means for supplying a flash voltage substantially at the inception of each inductive signal, a light source coupled to said rectifier means and being responsive to the flash voltages therefrom to flash, and an adapter housing constructed to mate with the detector housing, said light source being mounted in said adapter housing and arranged to direct the flashes toward the optical detector.

2. The adapter of claim 1, wherein said rectifier means includes resistor means, diode means and transistor means.

3. The adapter of claim 1, wherein said adapter further comprises a pair of conductors for connection to the battery of a vehicle.

4. The adapter of claim 1, wherein said inductive means includes means for supplying opposite polarities of the inductive signals, and said rectifier means includes means responsive substantially to the inception of one of the oppositely poled inductive signals for supplying a flash voltage.

5. The adapter of claim 1, and further comprising a printed circuit board on which said rectifier means is mounted.

6. The adapter of claim of 1, wherein said housings are tubular, and further comprising means for establishing a detachable connection between said housings.

7. The adapter of claim 1, wherein the detector housing is tubular, said adapter further comprising a tubular element attached to and protruding from said adapter housing, said tubular element having an outside diameter less than the inside diameter of the detector housing so as to be telescopically disposable therein, a resilient sealing material on said tubular element and establishing a detachable, frictional, light-tight connection with the detector housing.

8. The adapter of claim 7, wherein said resilient sealing material comprises a pair of axially spaced O-rings disposed in annular recesses in said tubular element.

9. The adapter of claim 7, wherein said end length of said tubular element is provided with a chamfer to facilitate insertion into the detector housing.

10. An adapter enabling use of a diesel-engine-timing meter to time a spark-ignited engine having at least one spark plug, a distributor conductor connected thereto in which a series of pulses of electrical current is generated as the spark plug fires, a rotating part having a surface irregularity therein, and means defining a receptacle and located so that the surface irregularity passes thereby, the diesel timing meter including an optical detector for producing an electrical signal in response to light developed during combustion in a diesel engine, the optical detector being carried by a detector housing, a magnetic probe insertable into the receptacle for producing a signal indicative of a top-dead-center event, a display for engine speed, and a display for the amount of timing angle, said adapter comprising inductive means adapted to be clipped onto the distributor conductor for supplying a series of inductive signals in response to the series of first pulses, rectifier means coupled to said inductive means for supplying a flash voltage substantially at the inception of each inductive signal, a light source coupled to said rectifier means and being responsive to the flash voltages therefrom to flash, and an adapter housing constructed to mate with the detector housing, said light source being mounted in said adapter housing and arranged to direct the flashes toward the optical detector.

11. The adapter of claim 10, wherein said rectifier means includes resistor means, diode means and transistor means.

12. The adapter of claim 10, wherein said adapter further comprises a pair of conductors for connection to the battery of a vehicle.

13. The adapter of claim 10, wherein said inductive means includes means for supplying opposite polarities of the inductive signals, and said rectifier means includes means responsive substantially to the inception of one of the oppositely poled electrical signals for supplying a flash voltage.

14. The adapter of claim 10, and further comprising a printed circuit board on which said rectifier means is mounted.

15. The adapter of claim 10, wherein said housings are tubular, and further comprising means for establishing a detachable connection between said housings.

16. The adapter of claim 10, wherein the detector housing is tubular, said adapter further comprising a tubular element attached to and protruding from said adapter housing, said tubular element having an outside diameter less than the inside diameter of the detector housing so as to be telescopically disposable therein, a resilient sealing material on said tubular element and establishing a detachable, frictional, light-tight connection with the detector housing.

17. The adapter of claim 16, wherein said resilient sealing material comprises a pair of axially spaced O-rings disposed in annular recesses in said tubular element.

18. The adapter of claim 16, wherein the end of said tubular element is provided with a chamfer to facilitate insertion into the detector housing.

* * * * *